United States Patent [19]
Ogawa et al.

[11] Patent Number: 5,577,414
[45] Date of Patent: Nov. 26, 1996

[54] ARTICULATED ROBOT

[75] Inventors: Masahiro Ogawa; Shuichi Tohnai; Masanori Nishi; Atsushi Ichibangase, all of Kitakyushu, Japan

[73] Assignee: Kabushiki Kaisha Yaskawa Denki, Fukuoka, Japan

[21] Appl. No.: 232,056

[22] PCT Filed: Sep. 20, 1993

[86] PCT No.: PCT/JP93/01345

§ 371 Date: Apr. 28, 1994

§ 102(e) Date: Apr. 28, 1994

[87] PCT Pub. No.: WO95/06546

PCT Pub. Date: Mar. 9, 1995

[30] Foreign Application Priority Data

Sep. 1, 1993 [JP] Japan .................... 5-52591 U

[51] Int. Cl.⁶ ................ B25T 9/06; B25T 17/00
[52] U.S. Cl. .................... 74/490.03; 414/744.5; 414/917; 901/15; 901/21; 901/48; 901/49
[58] Field of Search ............... 901/15, 21, 23, 901/48, 49, 29; 414/744.2, 744.5, 917; 74/490.01, 490.03

[56] References Cited

U.S. PATENT DOCUMENTS

| | | | |
|---|---|---|---|
| 4,433,495 | 2/1984 | Kishi | 414/694 X |
| 4,592,697 | 6/1986 | Tuda et al. | 901/48 X |
| 4,600,355 | 7/1986 | Johnson | 901/21 X |
| 4,640,663 | 2/1987 | Niinomi et al. | 901/48 X |
| 4,661,040 | 4/1987 | Cigna | 901/14 X |
| 4,946,337 | 8/1990 | Tonai et al. | 414/744.5 |
| 5,305,653 | 4/1994 | Ohtani et al. | 74/490.03 |
| 5,357,824 | 10/1994 | Hashimoto | 74/490.03 |

FOREIGN PATENT DOCUMENTS

| | | | |
|---|---|---|---|
| 55-75053 | 1/1982 | Japan . | |
| 56-106284 | 1/1983 | Japan . | |
| 58-17604 | 8/1984 | Japan . | |
| 55-101603 | 1/1985 | Japan . | |
| 59-32962 | 9/1985 | Japan . | |
| 59-224857 | 5/1986 | Japan . | |
| 2106286 | 4/1990 | Japan | 414/744.5 |
| 4164593 | 6/1992 | Japan | 414/917 |
| 642149 | 1/1979 | U.S.S.R. | 414/917 |

*Primary Examiner*—Charles A. Marmor
*Assistant Examiner*—Troy Grabow
*Attorney, Agent, or Firm*—Jordan and Hamburg

[57] ABSTRACT

An articulated robot comprises a parallelogrammic linkage comprising a fixed base (1) having a horizontal upper surface, a first arm (2) pivotally supported for turning about an axis perpendicular to the upper surface of the fixed base (1), a first auxiliary link (3) parallel to the first arm (2), and a second auxiliary link (4) pivotally joined to the respective extremities of the first arm (2) and the first auxiliary link (3); and a second arm (5) supported on the second auxiliary link (4) for turning about an axis parallel to the axis perpendicular to the upper surface of the fixed base (1). The motion of the second arm (5) is not restricted by the first arm (2), and the articulated robot is capable of moving a work between two separate points at a high speed.

22 Claims, 9 Drawing Sheets

In case of $L_1 = L_2$

In case of $L_1 > L_2$

५,५७७,४१४

ARTICULATED ROBOT

FIELD OF ART

The present invention relates to an articulated robot capable of operating at a high speed and, more particularly, to a construction comprising a plurality of robot arms.

BACKGROUND OF THE INVENTION

As shown in FIG. 12 by way of example, an articulated robot disclosed as in U.S. Pat. No. 4,433,495 that moves along the shortest route to transport a work or the like between two points such as two machine tools set a comparatively long distance from each other, has a fixed base 1 with a horizontal upper surface, and a parallelogrammic linkage comprising a first arm 2 pivotally supported onto fixed base 1 for turning at one end thereof by a pin 11, a first auxiliary link 3 pivotally supported onto fixed base 1 for turning at one end thereof by a pin 12, and a second auxiliary link 4 pivotally joined at its opposite ends to the respective extremities of first arm 2 and first auxiliary link 3 by pins 21 and 31. First arm 2 turns in a horizontal plane between positions indicated by alternate long and short dash lines. A gear wheel 22 is fixed to the first arm coaxially with pin 21. A second arm 5 is fixed to a rotary shaft 41 rotatably supported on second auxiliary link 4 at the middle of the same. A gear wheel 42 is fixed to rotary shaft 41 so as to mesh with gear wheel 22. When first arm 2 is turned, second arm 5 turns in the same direction. Thus, first arm 2 and second arm 5 are driven by a single driving means.

As shown in FIG. 13, another known articulated robot disclosed, by way of example, in U.S. Pat. No. 4,661,040 has a fixed base 1 with a horizontal upper surface, and a first arm 2 supported for turning about a vertical axis S1 on fixed base 1. A swivel base 20 is supported on the extremity of first arm 2 so as to be able to turn about an axis S2 parallel to axis S2. A second arm 5 is supported onto swivel base 20 for turning in a vertical plane about an axis U1 perpendicular to axis S2, and a third arm 6 is joined to the extremity of second arm 5 pivotally for turning about an axis U2 parallel to axis U1. A fourth arm 7 is supported on third arm 6 so as to be able to move longitudinally and to turn about an axis R. A wrist unit 8 is connected to the extremity of fourth arm 7 for turning about an axis B perpendicular to axis R, and an end effecter 9 is held on wrist unit 8 so as to be able to turn about an axis T perpendicular to axis B.

In the former articulated robot, since the turning motion of the first arm is transmitted through the gear wheels to the second arm, the motion of the second arm is restricted by that of the first arm, and the degree of freedom of the arms of the articulated robot is restricted. Furthermore, this articulated robot requires a complex construction.

In the latter articulated robot, since second arm 5 is mounted on first arm 2, second arm 5 turns together with first arm 2 through the same angle when first arm 2 is turned. Accordingly, when second arm 5 is turned in a direction opposite to the direction in which first arm 2 is turned to move wrist unit 8 held on second arm 5 along the shortest route between two separate points, i.e., along a straight line connecting the two points, second arm 5 must turn through substantially twice the angle through which first arm 2 is turned and hence, the working speed of second arm 5 must be doubled. Therefore, second arm 5 needs a larger driving unit for driving the same. Since the moment of inertia of second arm 5 is born entirely by first arm 2, first arm 2 needs a large-capacity driving motor and a large-capacity reduction gear.

Accordingly, it is an object of the present invention to provide a robot arm mechanism for an articulated robot capable of operating at a high speed, requiring a driving mechanism having a comparatively small capacity, and not subject to restrictions on the degree of freedom.

DISCLOSURE OF THE INVENTION

With the foregoing object in view, the present invention provides an articulated robot comprising a fixed base having a horizontal upper surface, a plurality of robot arms including a first arm, a second arm and a third arm, characterized in that a parallelogrammic linkage is formed by pivotally connecting a second auxiliary link at its opposite ends to the respective extremities of the first arm supported on the upper surface of the fixed base for turning about a vertical axis, and a first auxiliary link parallel to the first arm, the second arm is joined pivotally to the second auxiliary link for turning about an axis parallel to the vertical axis perpendicular to the upper surface of the fixed base, the third arm is joined pivotally to the extremity of the second arm, and a wrist unit is held on the extremity of the third arm.

Since the second arm is driven for turning on one of the links of the parallelogrammic linkage including the first arm by a driving source separate from the driving source for the first arm, the second arm can be turned without being restricted by the turning motion of the first arm, and the wrist unit can be moved between two separate points along a straight route.

DESCRIPTION OF THE PREFERRED EMBODIMENT

Figure 1A:
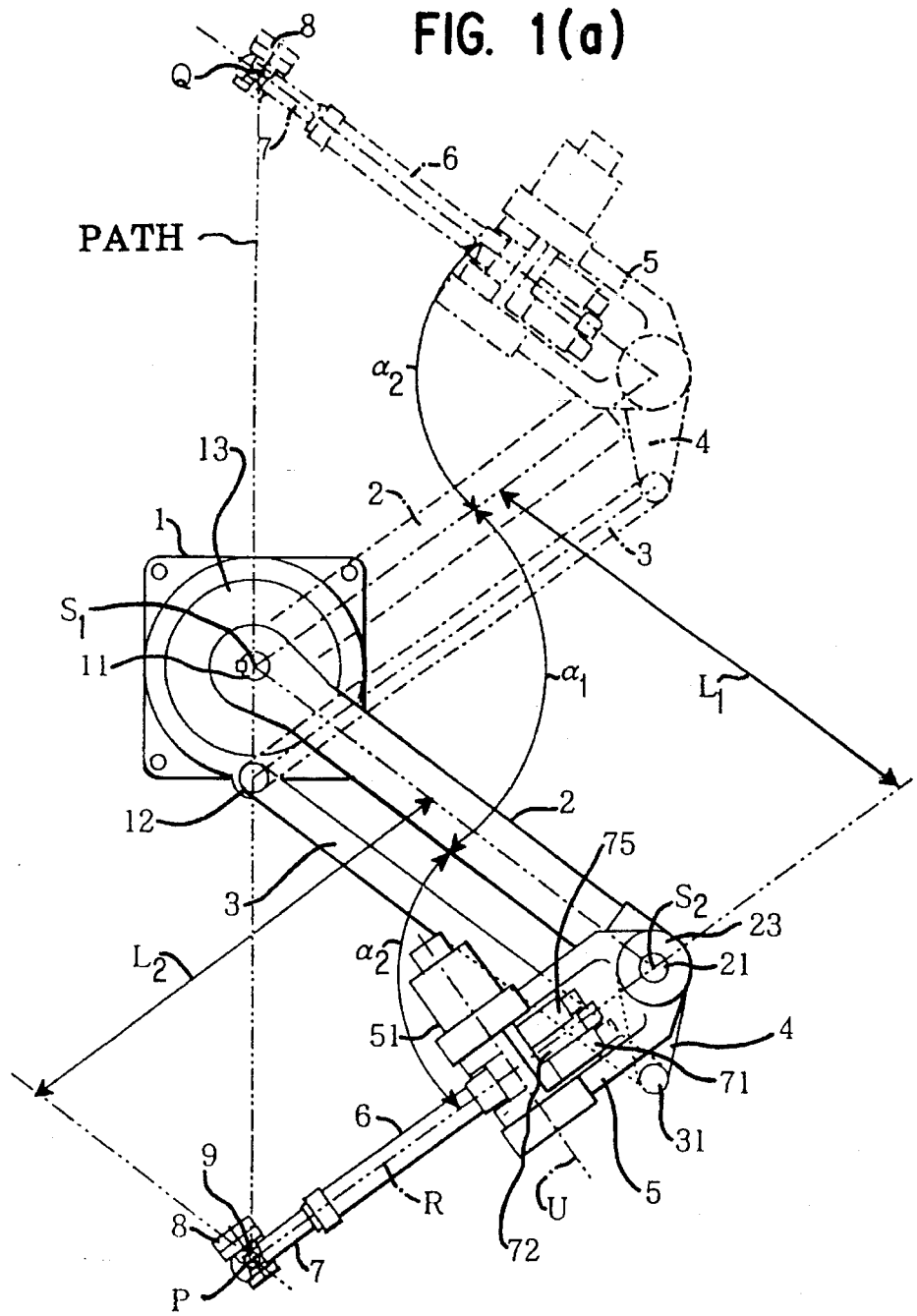
FIG. 1 is a plan view of a first embodiment of the present invention.
Figure 1B:
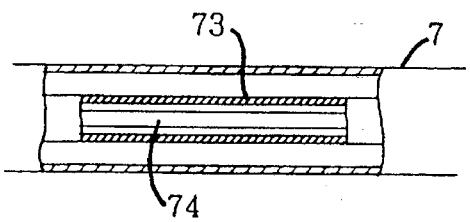
Figure 2:
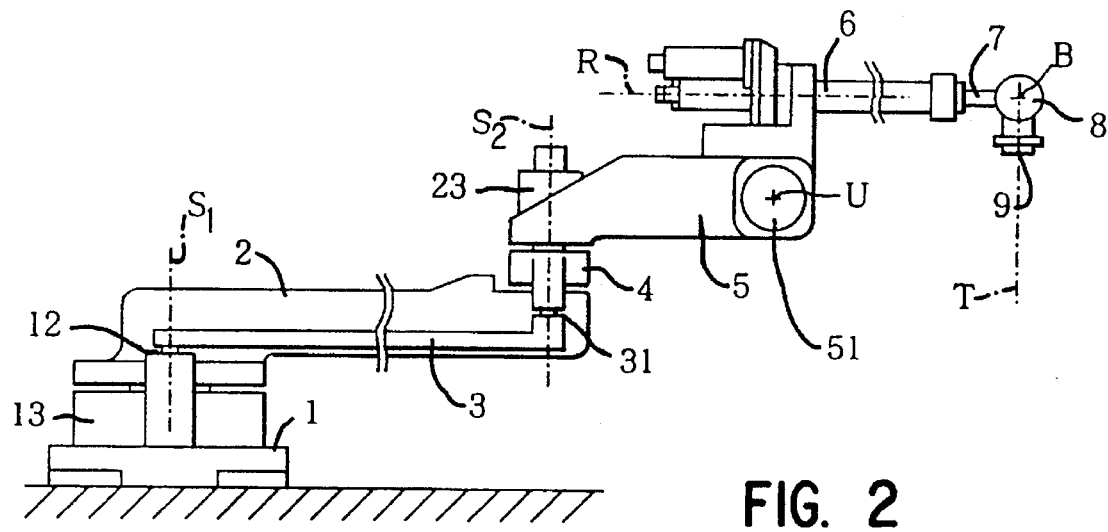
FIG. 2 is a side view of the first embodiment of the present invention.

FIG. 1(a) is a plan view of the first embodiment of the present invention and FIG. 2 is a side view of the same. A parallelogrammic linkage is formed on a fixed base 1 having a horizontal upper surface, a first arm 2 pivotally supported at one end thereof for turning about an axis S1 perpendicular to the upper surface of fixed base 1 by a pin 11 on the upper surface of fixed base 1, a first auxiliary link 3 pivotally supported at one end thereof for turning by a pin 12 on the upper surface of fixed base 1, and a second auxiliary link 4 pivotally joined at the opposite ends thereof to the respective extremities of first arm 2 and first auxiliary link 3 with pins 21 and 31, respectively. First arm 2 is driven for turning about axis S1 of pin 11 in a horizontal plane by a first drive motor 13 installed on fixed base 1. Second auxiliary link 4 is pivotally and coaxially with an axis S2 of pin 21 supported with the output shaft of a second drive motor 23, and the fixed part of second drive motor 23 is fixed to one end of second arm 5. A third drive motor 51 is supported on the other end of second arm 5 with its output shaft coaxial with an axis U perpendicular to axis S2 of pin 21 to drive a third arm 6 for swing motion in a vertical plane. A hollow fourth arm 7 is supported on the extremity of third arm 6 so as to be turned about longitudinal axis R of third arm 6 by a fourth drive motor 71. A wrist unit 8 is supported on the extremity of fourth arm 7. Wrist unit 8 is turned about an axis B perpendicular to axis R of third arm 6 through a hollow shaft 73 extended through fourth arm 7 as shown in FIG. 1(b), and a wrist gear mechanism 80 driven by a wrist drive motor 72. A rotary unit 9 is supported on wrist unit 8 so as to be turned about the longitudinal axis T of wrist unit 8 through a T-axis shaft 74 extended through hollow shaft 73 and wrist gear mechanism 80 by a T-axis drive motor 75.

When moving wrist unit 8 linearly from a point P to a point Q, first arm 2 is turned by first drive motor 13 and the second arm 5 is turned by second drive motor 23 from a position indicated by continuous lines to a position indicated by alternate long and short dash lines in FIG. 1. Supposing that first arm 2 is turned through an angle $\alpha 1$ and that the angle between first arm 2 and second arm 5 is $\alpha 2$, second arm 5 turns through an angle $(2\alpha 2-\alpha 1)$. Second auxiliary link 4 is translated without any rotation.

In a particular case where length L1 of first arm 2, and length L2 between the base end of second arm 5 and the wrist unit are equal to each other, the respective turning angles of first arm 2 and second arm 5 are the equal to each other.

Figure 3:
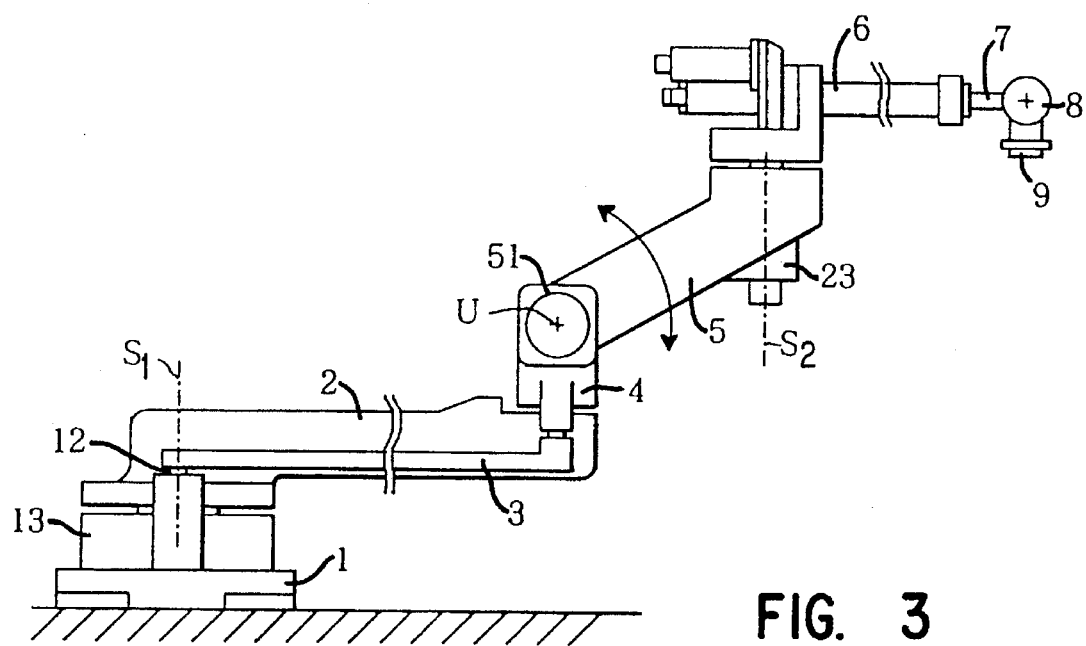
FIG. 3 is a side view of a second embodiment of the present invention.

Referring to FIG. 3 showing a second embodiment in a side view, a third drive motor 51 for turning a second arm 5 on its base end in a vertical plane is mounted on a second auxiliary link 4, and a second drive motor 23 is mounted on the front end of the second arm 5 to turn a third arm 6 in a horizontal plane. Thus, the front end of second arm 5 and all the components mounted on the front end of the second arm 2 can be moved up and down.

Figure 4:
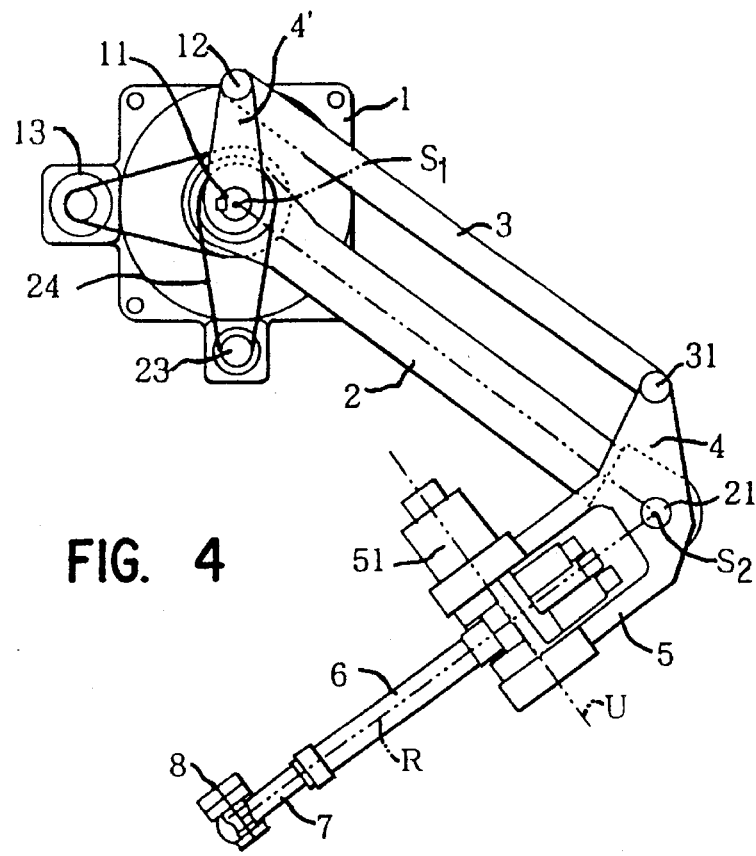
FIG. 4 is a plan view of a third embodiment of the present invention.

Referring to FIG. 4 showing a third embodiment in a plan view, a second arm drive link 4' parallel to a second auxiliary link 4 is joined pivotally to pins 11 and 12 of the parallelogrammic linkage of the first embodiment to form a parallelogrammic linkage together with a first arm 2, a first auxiliary link 3 and second auxiliary link 4. One end of second auxiliary link 4 is extended beyond a pin 21 to form a bifurcate second arm 5. Second arm drive link 4' is turned through a belt 24 by a second drive motor 23 installed on a fixed base 1 to turn a second arm 5. This construction reduces the weight born by first arm 2 by the weight of second drive motor 23 and enables the articulated robot to be of a compact construction.

Figure 5:
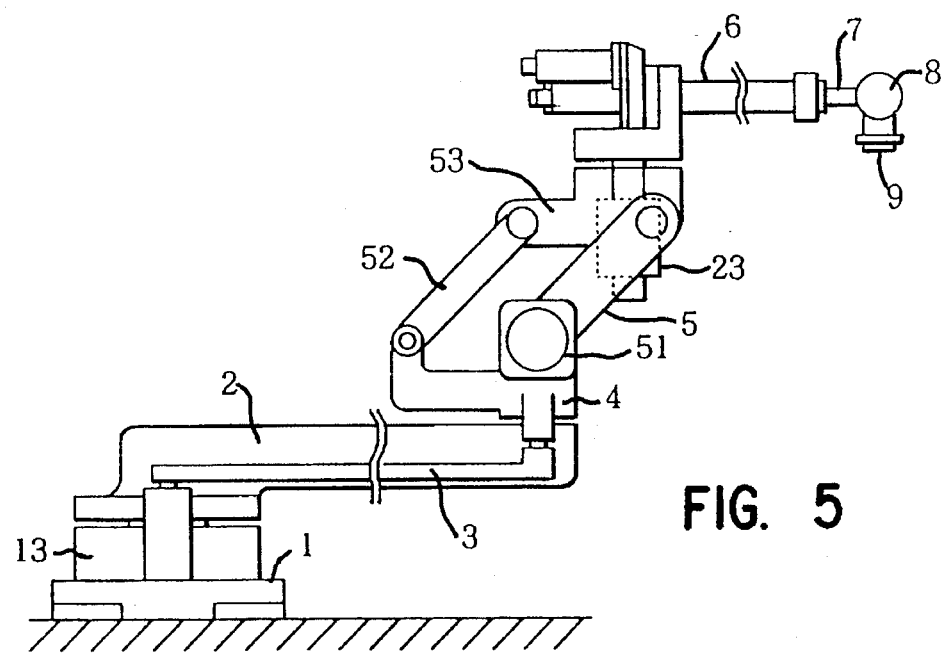
FIG. 5 is a side view of a fourth embodiment of the present invention.

Referring to FIG. 5 showing a fourth embodiment in a side view, a second arm 5, a second auxiliary link 4, a first auxiliary lifting link 52 and a second lifting auxiliary link 53 form a parallelogrammic linkage. A third arm 6 is turned in a horizontal plane by a second drive motor 23 mounted on second lifting auxiliary link 53, and third arm 6 is transferred vertically. Thus, third arm 6 is maintained in a horizontal position while the height of the same is adjusted.

Figure 6A:
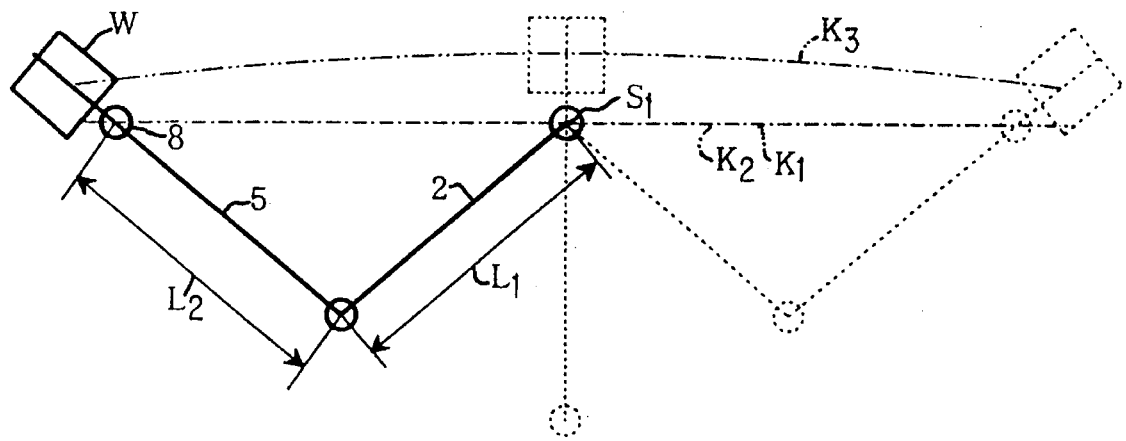
FIG. 6 is a diagrammatic view of assistance in explaining the motions of a fifth embodiment of the present invention.
Figure 6B:
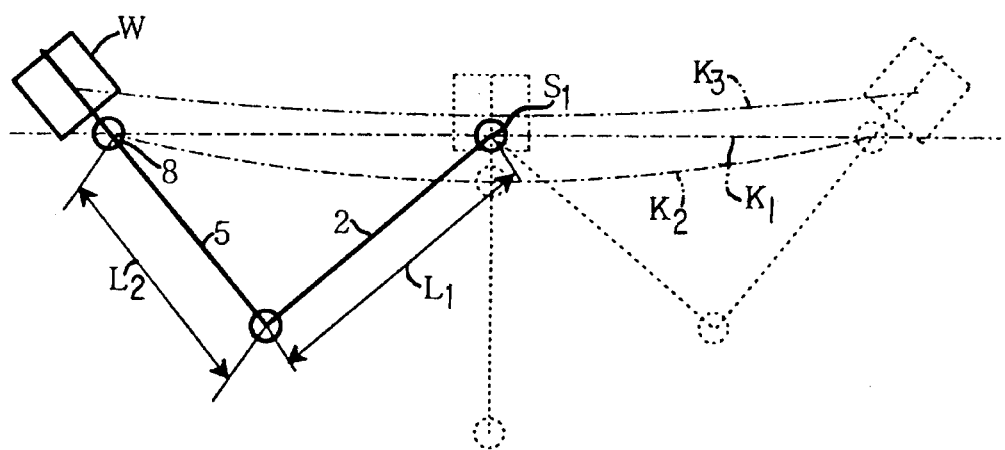

Referring to FIG. 6 showing a fifth embodiment in a diagrammatic view, the fifth embodiment has a structure that prevents a comparatively large work gripped by a wrist unit 8 from interfering with other structures while the work is moved. As shown in FIG. 6(a), the path K2 of wrist unit 8 coincides with a straight line K1 crossing an axis S1 when length L1 of first arm 2 and length L2 between the base end of a second arm 5 and wrist unit 8 are equal to each other. If work W juts out from wrist unit 8, the center of work W moves along a path K3, which is a circular arc curved outwardly from straight line K1 crossing axis S1, so that there is the possibility that work W may interfere with a structure located near straight line K1 crossing the axis S1.

When length L2 between the base end of second arm 5 and wrist unit 8 is shorter than length L1 of first arm 2, wrist unit 8 moves along a path K2, which is a circular arc curved inwardly from straight line K1 crossing axis S1, i.e., toward second arm 5, so that work W will not interfere with a structure located near straight line K1 crossing axis S1.

Figure 7:
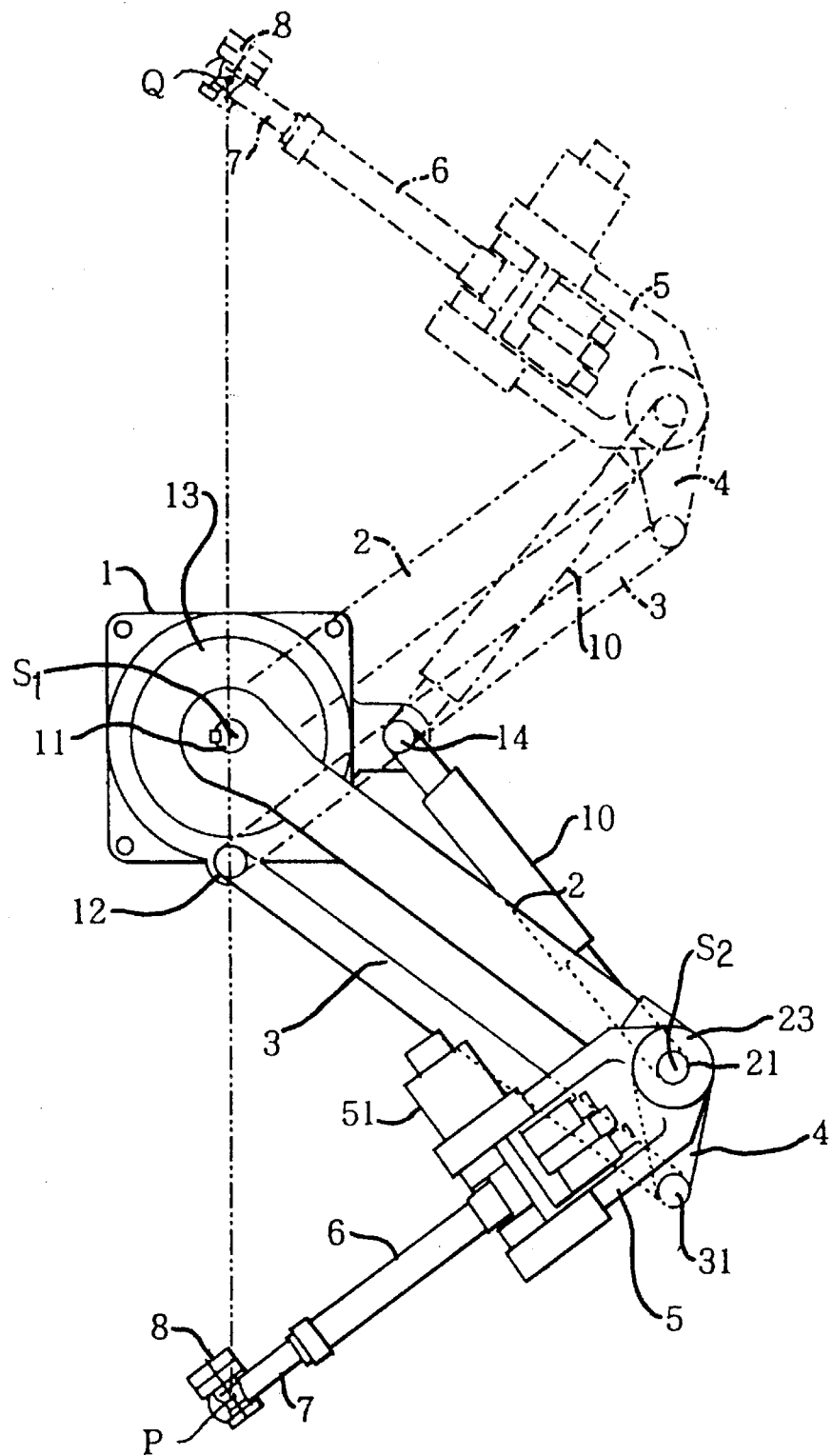
FIG. 7 is a plan view of a sixth embodiment of the present invention.

Referring to FIG. 7 showing a six embodiment in a plan view, the sixth embodiment has a construction that will reduce unbalanced moments while a wrist unit 8 is moved. A balancer 10 comprising a spring device has one end joined pivotally by a pin 14 to a fixed base 1 at a position dislocated from the center of fixed base 1 relative to the direction of the movement of wrist unit 8, and the other end pivotally supported on a pin 21 joining a first arm 2 and a second arm 5.

Although the load increases to a certain extent due to the resilience of the spring of balancer 10 when wrist unit 8 moves away from an axis S1 while the same is moved between a point P and a point Q, the load torque is not affected so greatly because the spring of balancer 10 does not extend greatly. However, while wrist unit 8 is moving near point P or point Q, in which a first drive motor 13 is decelerated, the spring of balancer 10 extends greatly to promote the deceleration of first drive motor 13 by controlling the turning motion of first arm 2 and, consequently, the load for deceleration is reduced.

When wrist unit 8 is moved from point P or point Q toward axis S1, namely, during the acceleration of the first arm by first drive motor 13, the spring of balancer 10 reduces the load for acceleration.

Figure 8:
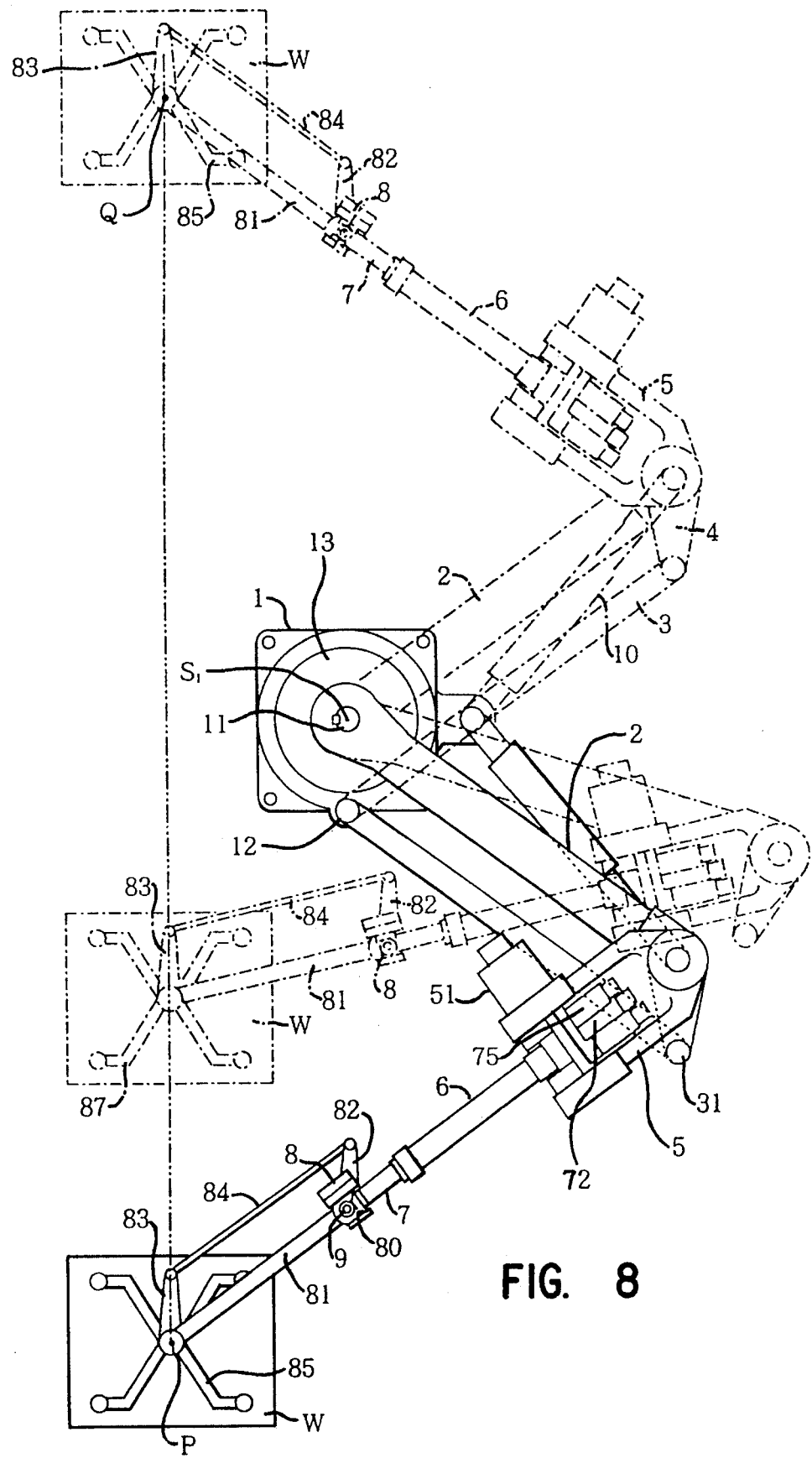
FIG. 8 is a plan view of a seventh embodiment of the present invention.
Figure 9:
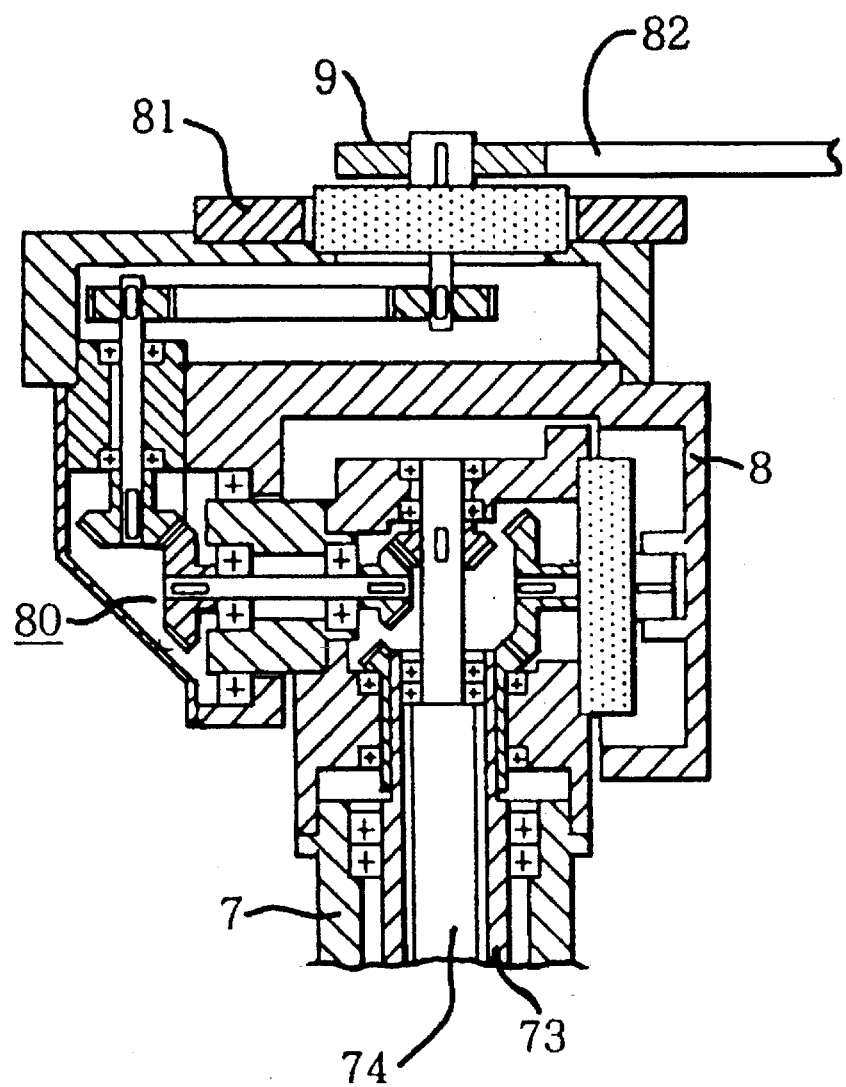
FIG. 9 is a sectional side view of a wrist unit in accordance with the present invention.

Referring to FIG. 8 showing a seventh embodiment in a plan view, a parallelogrammic wrist linkage is formed of a first wrist link 81 extending along the extension of a third arm 6 fixed to a wrist unit 8, a second wrist link 82 fixed to a rotary member 9 rotatably supported on wrist unit 8, a third wrist link 83 pivotally joined to the extremity of first wrist link 81 with a pin, and a fourth wrist link 84 pivotally joined to the respective extremities of second wrist link 82 and third wrist link 83 with pins and extending parallel to first wrist link 81. As shown in FIG. 9, second wrist link 82 is driven for turning by a T-axis drive motor 75 disposed behind third arm 6 through a T-axis shaft extended through a hollow shaft 73 supported in a fourth arm 7, a wrist gear mechanism 80 and rotary member 9. Wrist gear mechanism 80 interlocks hollow shaft 73 and wrist unit 8 by a bevel gear train comprising a plurality of bevel gear wheels to turn wrist unit 8 about an axis B perpendicular to an axis R. Rotary member 9 turns about an axis T perpendicular to axis B of wrist unit 8. A gripper 85 for gripping a work W is fixed to third wrist link 83 at a position near first wrist link 81.

When moving work W from a point P to a point Q, a first arm 2 and a second arm 5 are turned, and gripper 85 is turned by the parallelogrammic wrist linkage so that work W gripped by gripper 85 remains in a fixed angular position with respect to the direction of movement as indicated by alternate long and short dash lines in FIG. 8.

Figure 10:
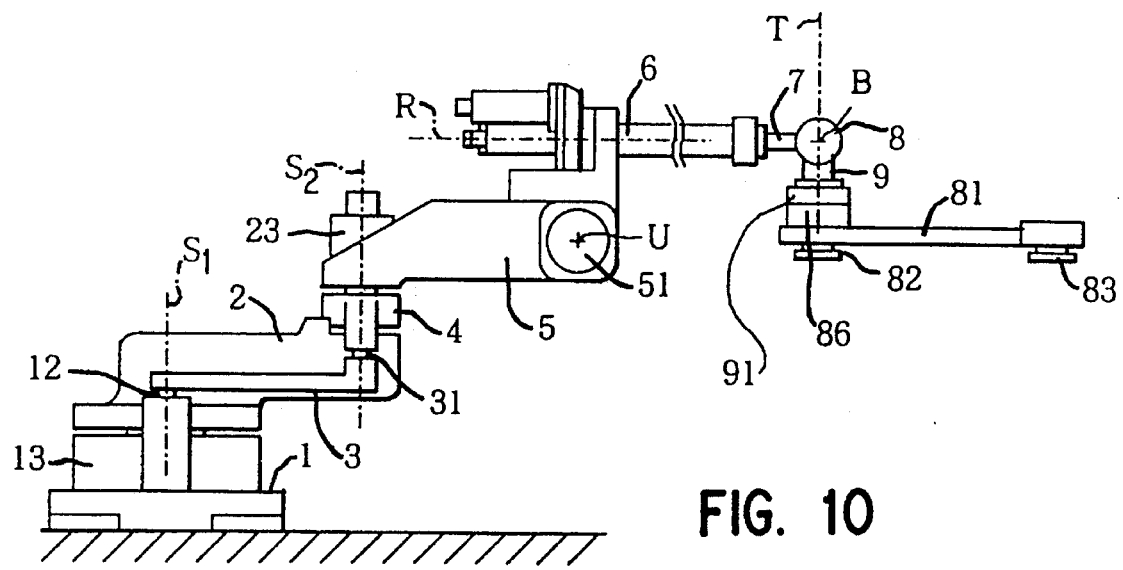
FIG. 10 is a side view of an eighth embodiment of the present invention.

Referring to FIG. 10 showing an eighth embodiment in a side view, a shock sensor 91 and floating mechanisms 86 and 87 are provided between a wrist unit 8 and a first wrist link 81 and between a rotary member 9 and a second wrist link 82 to detect an overload on wrist unit 8 when moving and to absorb the overload when an excessively large force acts against the wrist unit such as may occur during a collision of a gripper 85 or work W held by gripper 85 against an external structure.

Figure 11:
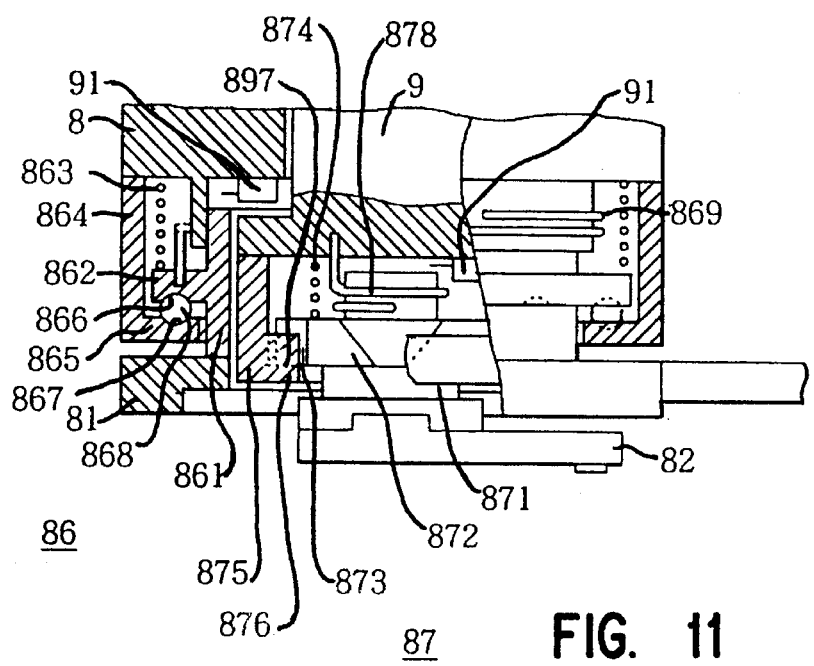
FIG. 11 is a fragmentary sectional side view of an essential part of the eighth embodiment of the present invention.
Figure 12:
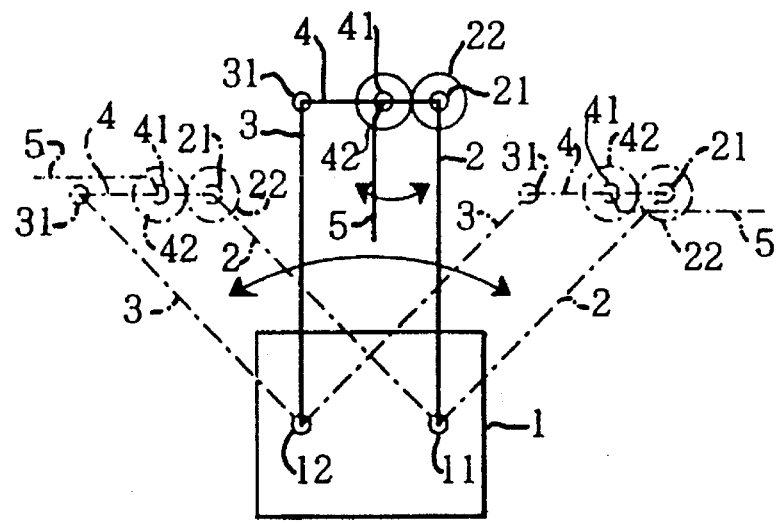
FIG. 12 is a diagrammatic view of a known articulated robot.
Figure 13:
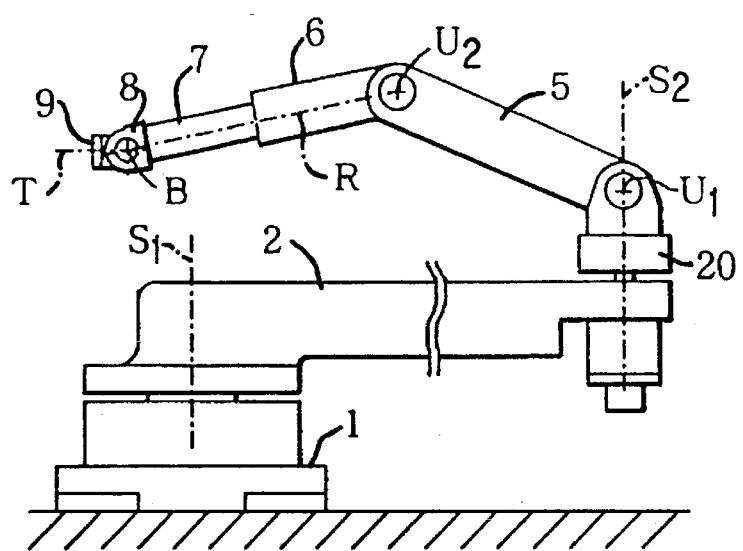
FIG. 13 is a side view of another known articulated robot.

As shown in FIG. 11, floating mechanism 86 has a sliding member 861 provided with a flange 862, supported for vertical movement in the lower part of wrist unit 8 and fixed to a first wrist link 81. A compression spring 863 is compressed between the lower surface of wrist unit 8 and flange 862 of sliding member 861. A casing 864 having an inner flange 865 at its lower end is connected to the lower end of wrist unit 8 with inner flange 865 facing the lower surface of flange 862 so as to surround compression spring 863. Recesses 866 and 867 are formed respectively in the lower surface of flange 862 and the upper surface of inner flange 865 facing the lower surface of flange 862, and balls 866 are held between recesses 866 and 867. A return coil spring 869 has one end fixed to wrist unit 8 and the other end fixed to sliding member 861.

Floating mechanism 87 has a support shaft 871 fixed to second wrist link 82 with a space between support shaft 871 and the extremity of rotary member 9 that turns about an axis T of wrist unit 8. Support shaft 871 is provided with a circular flange 872, and a plurality of projections 873 each having inclined surfaces slenderizing toward lower surfaces of the flange 872, and arranged at equal angular intervals. A compression spring 874 is compressed between the extremity of rotary member 9 and flange 872. A guide ring 875 provided with an inner flange 876 on its lower end is connected to the extremity of rotary member 9 so as to surround flange 872. Recesses 877 having the same inclination as the inclined surfaces of projections 873 are formed in the upper surface of inner flange 876 facing flange 872, and projections 873 are meshed in recesses 877. A return coil spring 878 has one end fixed to rotary member 9 and the other end fixed to support shaft 871.

When an excessively large force acts on first wrist link 81 in the direction of movement of wrist unit 8, the excessively large force tries to turn sliding member 861 about axis T together with wrist link 81 relative to wrist unit 8 against the resilience of return coil spring 869. Then, balls 868 held between recesses 866 formed in flange 862 and recesses 867 formed in casing 864 fixed to wrist unit 8 are pushed out of recesses 866 and 867 and are caused to move onto the upper surface of inner flange 865. Then, balls 868 become free to roll to enable first wrist link 81 to turn freely about axis T. When balls 868 move onto the upper surface of inner flange 865, sliding member 861 is forced to move axially against the resilience of compression spring 863 to actuate shock sensor 91, and the shock sensor then provides an output signal to stop the motion of first wrist link 81.

Upon the removal of the overload from first wrist link 81, sliding member 861 is turned in the reverse direction by return coil spring 869, balls 868 return to recesses 866 and 865 and first wrist link 81 returns to its normal position.

Similarly, when an excessive force acts on second wrist link 82, support shaft 871 is turned together with second wrist link 82 relative to rotary member 9 against the resilience of return coil spring 878. Then, projections 873 of flange 872 move along the inclined surfaces in a circumferential axial direction, and projections 873 are disengaged from recesses 877, so that flange 872 and support shaft 871 become free to turn. Flange 872 is moved axially to actuate shock sensor 91 so that the turning of rotary member 9 is stopped.

Upon the removal of the overload from second wrist link 82, flange 872 is turned in the reverse direction by return coil spring 878, the projections come into engagement with recesses 877 and second wrist link 82 is returned to its normal position.

As is apparent from the foregoing description, according to the present invention, the turning motion of the second arm is not restricted by the turning motion of the first arm because the second arm can be driven for turning on one of the links of the parallelogrammic linkage including the first arm by a driving source independent of the driving source for turning the first arm. The torque necessary for driving axis S1 is comparatively small because the effect of moment of inertia about axis S2 does not work on axis S1, the load on the first arm is comparatively small because the drive motor for driving the second arm can be mounted on the fixed base, the capacity of the driving mechanism may be comparatively small, and an articulated robot capable of moving between two separate points at a high speed and not subject to restrictions on the degree of freedom is provided.

When the length of the first arm and the length between the extremity of the first arm and the wrist unit are different from each other, the work can be moved along a nearly straight path so that the work will not interfere with external structures. The balancer interposed between the first arm and the fixed base reduces the load on the drive motor for driving the first arm. The gripper held on the parallelogrammic linkage connected to the wrist unit keeps the work gripped by the gripper always in a fixed angular position with respect to the direction of movement of the work.

The float mechanisms and the shock sensor interposed between the wrist unit and the first wrist link and between the rotary member and the second wrist link detect an overload with respect to the direction of movement of the wrist unit and absorb the overload to protect the components.

INDUSTRIAL FEASIBILITY

The present invention is applicable to fields in which works are transported along a programmed path between stations by an industrial robot.

We claim:

1. An articulated robot comprising:

a fixed base having an upper horizontal surface;

a parallelogrammic linkage pivotally mounted on the fixed base and comprising a first arm pivotally supported on said fixed base for turning about a first axis perpendicular to the upper surface of the fixed base, a first auxiliary link pivotally supported on said fixed base and disposed parallel to the first arm, and a second auxiliary link pivotally joined to the respective extremities of the first arm and the first auxiliary link;

a second arm pivotally supported on the parallelogrammatic linkage for turning about a second axis parallel to said first axis;

a third arm pivotally supported on the extremity of the second arm; and a wrist unit supported on the extremity of the third arm, a first wrist link extending along the longitudinal extent of the third arm and fixed to the wrist unit, a second wrist link pivotally supported on the wrist unit, a third wrist link pivotally supported on the extremity of the first wrist link with a pin, a fourth wrist link pivotally supported on the respective extremities of the first wrist link and the second wrist link with pins, said fourth wrist link being parallel to the first wrist link; a wrist link drive motor disposed to rotate the second wrist link through a rotary member, and a gripper fixed to the third wrist link.

2. An articulated robot according to claim 1, further comprising: a floating mechanism interlocking the wrist unit and the first wrist link, and comprising a casing fixed to the wrist unit, a sliding member fixed to the first wrist link, an interlocking means for interlocking the casing and the sliding member and capable of disengaging the casing and the sliding member when a torque for turning the casing and the sliding member relative to each other exceeds a predetermined value, and a return spring always urging the wrist unit and the first wrist link so that a predetermined positional relation between the wrist unit and the first wrist link is maintained; and a shock sensor that is actuated when the casing and the sliding member are disengaged.

3. An articulated robot according to claim 1, further comprising: a floating mechanism disposed between the rotary member and the second wrist link and comprising a guide ring fixed to the rotary member, a support shaft fixed to the second wrist link, an interlocking means interlocking the guide ring and the support shaft and capable of disengaging the guide ring and the support shaft when a torque for turning the guide ring and the support shaft relative to each other exceeds a predetermined value, and a return spring always urging the rotary member and the second wrist link so that a predetermined positional relation between the rotary member and the second wrist link is maintained; and a shock sensor that is actuated when the guide ring and the support shaft are disengaged.

4. An articulated robot comprising:

a fixed base having a horizontal upper surface;

a parallelogrammatic linkage mounted on said upper surface, said parallelogrammatic linkage comprising:
a first arm pivotally mounted on said upper surface for pivotal movement about a first vertical axis;
a first drive motor interposed between said base and said first arm for pivoting said first arm about said first vertical axis;
a first auxiliary link pivotal about a second vertical axis, said first auxiliary link being parallel to said first arm;
said first arm and said first auxiliary link each having end portions;
a second auxiliary link pivotally connected to said end portion of said first arm and said end portion of said first auxiliary link; and
said end portion of said first arm being pivotally connected to said second auxiliary link for pivoting about a third vertical axis;

an articulated manipulator mounted on said parallelogrammatic linkage, said articulated manipulator comprising:
a second arm;
mounting means pivotally mounting said second said arm on said parallelogrammatic linkage;
said second arm having an end portion;
a third arm pivotally mounted on said end portion of said second arm;
said third arm having an end portion; and
a wrist unit supported on said end portion of said third arm;

a second drive motor operably interposed between said parallelogrammatic linkage and said second arm for pivoting said second arm about said third vertical axis.

5. An articulated robot according to claim 4 further comprising a third drive motor operably interposed between said second and third arms for pivoting said third arm about a horizontal axis.

6. An articulated robot comprising:

a fixed base having a horizontal upper surface;

a parallelogrammatic linkage mounted on said upper surface, said parallelogrammatic linkage comprising:
a first arm pivotally mounted on said upper surface for pivotal movement about a first vertical axis;
a first drive motor interposed between said base and said first arm for pivoting said first arm about said first vertical axis;
a first auxiliary link pivotal about a second vertical axis, said first auxiliary link being parallel to said first arm;
said first arm and said first auxiliary link each having end portions; and
a second auxiliary link pivotally connected to said end portion of said first arm and said end portion of said first auxiliary link;

an articulated manipulator mounted on said parallelogrammatic linkage, said articulated manipulator comprising:
a second arm;
mounting means pivotally mounting said second said arm on said parallelogrammatic linkage;
said second arm having an end portion;
a third arm pivotally mounted on said end portion of said second arm;
said third arm having an end portion; and
a wrist unit supported on said end portion of said third arm;

a second drive motor operably interposed between said parallelogrammatic linkage and said second arm for pivoting said second arm about a horizontal axis.

7. An articulated robot according to claim 6 further comprising a third drive motor operably interposed between said second and third arms for pivoting said third arm about a third vertical axis.

8. An articulated robot comprising:

a fixed base having a horizontal upper surface;

a parallelogrammatic linkage mounted on said upper surface, said parallelogrammatic linkage comprising:
a first arm pivotally mounted on said upper surface for pivotal movement about a first vertical axis;
a drive motor interposed between said base and said first arm for pivoting said first arm about said first vertical axis;
a first auxiliary link pivotal about a second vertical axis, said first auxiliary link being parallel to said first arm;
said first arm and said first auxiliary link each having end portions; and
a second auxiliary link pivotally connected to said end portion of said first arm and said end portion of said first auxiliary link;

an articulated manipulator mounted on said parallelogrammatic linkage, said articulated manipulator comprising:

a second arm having a U-shaped configuration having a base portion and two spaced leg portions extending from said base portion;

mounting means pivotally mounting said second said arm on said parallelogrammatic linkage;

said second arm having an end portion;

a third arm pivotally mounted on said end portion of said second arm;

means on said spaced leg portions of said second arm mounting said third arm for pivotal movement about a horizontal axis;

said third arm having an end portion; and a wrist unit supported on said end portion of said third arm.

9. An articulated robot comprising:

a fixed base having a horizontal upper surface;

a parallelogrammatic linkage mounted on said upper surface, said parallelogrammatic linkage comprising:

a first arm pivotally mounted on said upper surface for pivotal movement about a first vertical axis;

a first drive motor interposed between said base and said first arm for pivoting said first arm about said first vertical axis;

a first auxiliary link pivotal about a second vertical axis, said first auxiliary link being parallel to said first arm;

said first arm and said first auxiliary link each having end portions; and a second auxiliary link pivotally connected to said end portion of said first arm and said end portion of said first auxiliary link;

a link arm pivotally mounted on said base for pivotal movement about said first vertical axis; and pivot means pivotally connecting said link arm to said first auxiliary link;

an articulated manipulator mounted on said parallelogrammatic linkage, said articulated manipulator comprising:

a second arm;

mounting means pivotally mounting said second said arm on said parallelogrammatic linkage;

said second arm having an end portion;

a third arm pivotally mounted on said end portion of said second arm;

said third arm having an end portion; and a wrist unit supported on said end portion of said third arm;

a second drive motor means on said base operably connected to said link arm for effecting pivoting of said link arm about said first pivotal axis.

10. An articulated robot according to claim 9 wherein said second auxiliary link and said second arm are formed as an integral one-piece unit.

11. An articulated robot according to claim 10 wherein said integral one-piece unit has first pivotal means pivotally connected to said first arm, second pivotable means pivotally connected to said first auxiliary link, and third pivotable means pivotally connected to said third arm.

12. An articulated robot according to claim 11 wherein said second drive motor on said base is operable to effect pivoting of said integral one-piece unit about said first pivotal means.

13. An articulated robot comprising:

a fixed base having a horizontal upper surface;

a parallelogrammatic linkage mounted on said upper surface, said parallelogrammatic linkage comprising:

a first arm pivotally mounted on said upper surface for pivotal movement about a first vertical axis;

a drive motor interposed between said base and said first arm for pivoting said first arm about said first vertical axis;

a first auxiliary link pivotal about a second vertical axis, said first auxiliary link being parallel to said first arm;

said first arm and said first auxiliary link each having end portions; and a second auxiliary link pivotally connected to said end portion of said first arm and said end portion of said first auxiliary link;

an articulated manipulator mounted on said parallelogrammatic linkage, said articulated manipulator comprising:

a second arm;

mounting means pivotally mounting said second said arm on said parallelogrammatic linkage;

said second arm having an end portion;

a third arm pivotally mounted on said end portion of said second arm;

said third arm having an end portion; and a wrist unit supported on said end portion of said third arm;

said second arm comprising a second parallelogrammatic linkage having a plurality of parallelogrammatic link parts pivotally connected to one another for pivotal movement about horizontal axes, said second parallelogrammatic linkage being operable to maintain a level orientation of said third arm as said second parallelogrammatic linkage displaces said third arm.

14. An articulated robot according to claim 13 further comprising a second motor operably interposed between said second parallelogrammatic linkage and said third arm to effect displacement of said third arm relative to said second parallelogrammatic linkage.

15. An articulated robot comprising:

a fixed base having a horizontal upper surface;

a parallelogrammatic linkage mounted on said upper surface, said parallelogrammatic linkage comprising:

a first arm pivotally mounted on said upper surface for pivotal movement about a first vertical axis;

a drive motor interposed between said base and said first arm for pivoting said first arm about said first vertical axis;

a first auxiliary link pivotal about a second vertical axis, said first auxiliary link being parallel to said first arm;

said first arm and said first auxiliary link each having end portions; and a second auxiliary link pivotally connected to said end portion of said first arm and said end portion of said first auxiliary link;

an articulated manipulator mounted on said parallelogrammatic linkage, said articulated manipulator comprising:

a second arm;

mounting means pivotally mounting said second said arm on said parallelogrammatic linkage;

said second arm having an end portion;

a third arm pivotally mounted on said end portion of said second arm;

said third arm having an end portion; and a wrist unit supported on said end portion of said third arm;

said wrist unit on said third arm comprising a second parallelogrammatic linkage having a plurality of parallelogrammatic link parts pivotally connected to one another for pivotal movement about vertical axes, a work gripper mounted on said parallelogrammatic linkage, said second parallelogrammatic linkage being operable to maintain a fixed orientation of said parallelogrammatic link parts and said work gripper mounted on said parallelogrammatic link parts as said first and second arms move said third arm.

16. An articulated robot according to claim 15 wherein said second parallelogrammatic linkage comprises overload means operable to indicate an overload on at least one of said parallelogrammatic link arms of said second parallelogrammatic linkage.

17. An articulated robot according to claim 16 wherein said overload means comprises an actuating member and spring means, said actuating member overcoming the bias of said spring means and being displaced when overload occurs.

18. An articulated robot according to claim 17 wherein said overload means further comprises sensor means actuated by said actuating means when said actuating means is displaced when overload occurs.

19. An articulated robot comprising:
a base;
a parallelogrammatic linkage mounted on said base, said parallelogrammatic linkage comprising:
  a first arm pivotally mounted on said upper surface for pivotal movement about a first vertical axis;
  a first drive motor interposed between said base and said first arm for pivoting said first arm about said first vertical axis;
  a first auxiliary link pivotal about a second vertical axis, said first auxiliary link being parallel to said first arm;
  said first arm and said first auxiliary link each having end portions; and
  a second auxiliary link pivotally connected to said end portion of said first arm for pivotal movement about a third vertical axis, said second auxiliary link also being pivotally connected to said end portion of said first auxiliary link for pivotal movement about a fourth vertical axis;
an articulated manipulator mounted on said parallelogrammatic linkage, said articulated manipulator comprising:
a second arm;
mounting means pivotally mounting said second arm on said parallelogrammatic linkage; and
manipulator means pivotably mounted on said second arm, said manipulator means including a robotic wrist mechanism;
a second drive motor having an axis of rotation, said second drive motor being interposed between said first arm and said second arm for pivoting said second arm about said third vertical axis, said axis of rotation of said second drive motor being coincident with said third vertical axis.

20. An articulated robot comprising:
a base;
a parallelogrammatic linkage mounted on said base, said parallelogrammatic linkage comprising:
  a first arm pivotally mounted on said upper surface for pivotal movement about a first vertical axis;
  a drive motor interposed between said base and said first arm for pivoting said first arm about said first vertical axis;
  a first auxiliary link pivotal about a second vertical axis, said first auxiliary link being parallel to said first arm;
  said first arm and said first auxiliary link each having end portions; and
  a second auxiliary link pivotally connected to said end portion of said first arm for pivotal movement about a third vertical axis, said second auxiliary link also being pivotally connected to said end portion of said first auxiliary link for pivotal movement about a fourth vertical axis;
an articulated manipulator mounted on said parallelogrammatic linkage, said articulated manipulator comprising:
a second arm;
mounting means pivotally mounting said second arm on said parallelogrammatic linkage; and
manipulator means pivotably mounted on said second arm, said manipulator means including a robotic wrist mechanism;
a second drive motor having a horizontal axis of rotation, said second drive motor being interposed between said first arm and said second arm for pivoting said second arm about a horizontal pivot axis, said horizontal axis of rotation of said second drive motor being coincident with said horizontal pivot axis.

21. An articulated robot according to claim 20 wherein said second drive motor overlies said parallelogrammatic linkage.

22. An articulated robot comprising:
a base;
a parallelogrammatic linkage mounted on said base, said parallelogrammatic linkage comprising:
  a first arm pivotally mounted on said upper surface for pivotal movement about a first vertical axis;
  a drive motor interposed between said base and said first arm for pivoting said first arm about said first vertical axis;
  a first auxiliary link pivotal about a second vertical axis, said first auxiliary link being parallel to said first arm;
  said first arm and said first auxiliary link each having end portions; and
  a second auxiliary link pivotally connected to said end portion of said first arm for pivotal movement about a third vertical axis, said second auxiliary link also being pivotally connected to said end portion of said first auxiliary link for pivotal movement about a fourth vertical axis;
an articulated manipulator mounted on said parallelogrammatic linkage, said articulated manipulator comprising:
a second arm;
mounting means pivotally mounting said second arm on said parallelogrammatic linkage; and
manipulator means pivotably mounted on said second arm, said manipulator means including a robotic wrist mechanism;
a second drive motor mounted on said base, a link arm means interposed between said second drive motor and said first auxiliary link, said link arm being rotatable about said first vertical axis, said second drive motor being operable to rotate said link arm about said first vertical axis such that said rotation of said link arm drives said first auxiliary link to effect rotation of said second arm about said third vertical axis.

* * * * *